United States Patent
Nakayama

(10) Patent No.: US 8,972,363 B2
(45) Date of Patent: Mar. 3, 2015

(54) RULE DISCOVERY SYSTEM, METHOD, APPARATUS AND PROGRAM

(71) Applicant: NEC Corporation, Minato-ku, Tokyo (JP)

(72) Inventor: Hiroki Nakayama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/115,532

(22) PCT Filed: May 13, 2013

(86) PCT No.: PCT/JP2013/063319
§ 371 (c)(1),
(2) Date: Nov. 4, 2013

(87) PCT Pub. No.: WO2013/172310
PCT Pub. Date: Nov. 21, 2013

(65) Prior Publication Data
US 2014/0250092 A1 Sep. 4, 2014

(30) Foreign Application Priority Data
May 14, 2012 (JP) ................................ 2012-110923

(51) Int. Cl.
*G06F 7/00* (2006.01)
*G06F 17/00* (2006.01)
*G06F 17/30* (2006.01)

(52) U.S. Cl.
CPC ................................ *G06F 17/30371* (2013.01)
USPC ........................................... 707/694; 706/47

(58) Field of Classification Search
None
See application file for complete search history.

(56) References Cited

U.S. PATENT DOCUMENTS

| | | | | |
|---|---|---|---|---|
| 6,061,682 A | * | 5/2000 | Agrawal et al. | 707/694 |
| 6,321,217 B1 | * | 11/2001 | Maeda et al. | 706/47 |
| 6,385,608 B1 | * | 5/2002 | Mitsuishi et al. | 1/1 |
| 2005/0097072 A1 | * | 5/2005 | Brown et al. | 707/1 |
| 2005/0149460 A1 | * | 7/2005 | Tuzhilin et al. | 706/12 |
| 2006/0095411 A1 | * | 5/2006 | Baba et al. | 707/3 |
| 2010/0250596 A1 | * | 9/2010 | Fan et al. | 707/776 |
| 2011/0113001 A1 | * | 5/2011 | Byrne et al. | 706/50 |
| 2011/0138312 A1 | * | 6/2011 | Yeh et al. | 715/771 |

(Continued)

FOREIGN PATENT DOCUMENTS

| JP | 6-110749 A | 4/1994 |
|---|---|---|
| JP | 2006-58974 A | 3/2006 |
| WO | 2004/036496 A1 | 4/2004 |

OTHER PUBLICATIONS

User Profiling in Personalization Applications through Rule Discovery and Validation, Adomavicius et al., ACM, pp. 377-381, 1999.*

(Continued)

*Primary Examiner* — Augustine K Obisesan
(74) *Attorney, Agent, or Firm* — Sughrue Mion, PLLC

(57) ABSTRACT

A system includes a unit to generate a set of free itemsets with a frequency in a database greater than or equal to a threshold value, a unit to generate a rule candidate with, a conditional part set to the free itemset α, and a consequent part set to an item x not sharing an attribute with the free itemset, and finds a set of attributes of an antecedent part of the rule by depth first search, the attribute not included in neither α nor x, a unit to collate the rule to the database to judge validity of the rule, and a unit to check for minimality of the rule decided to be valid to output the rule when the rule is minimal.

10 Claims, 4 Drawing Sheets

(56) References Cited

U.S. PATENT DOCUMENTS

| | | | |
|---|---|---|---|
| 2013/0016395 A1* | 1/2013 | Akutsu | 358/1.15 |
| 2013/0031044 A1* | 1/2013 | Miranda et al. | 706/47 |
| 2013/0226879 A1* | 8/2013 | Talukder et al. | 707/690 |

OTHER PUBLICATIONS

Wenfei Fan et al., "Discovering Conditional Functional Dependencies", IEEE International Conference on Data Engineering, 2009, DOI 10.1109/ICDE.2009.208, pp. 1231-1234, retrieved on Apr. 9, 2012, Internet URL <http://homepages.inf.ed.ac.uk/fgeerts/pdf/icde09.pdf>. Cited in the Applicant's Specification.

Fei Chiang et al., "Discovering Data Quality Rules", VLDB Endowment, VLDB '08, Aug. 24-30, 2008, Auckland, New Zealand, retrieved on Apr. 9, 2012, Internet URL <http://dblab.cs.toronto.edu/~ fchiang/docs/vldb08.pdf>. Cited in the Applicant's Specification.

International Search Report for PCT Application No. PCT/JP2013/063319, mailed on Jun. 18, 2013. (Japanese Language).

Written Opinion of the International Search Authority, PCT/ISA/237, for PCT Application No. PCT/JP2013/063319, mailed on Jun. 18, 2013.

* cited by examiner

FIG. 3A (step A1)
frequent free itemsets:
{empty (frequency: 4), attribute 1:1 (frequency: 2),
attribute 2:P (frequency: 2),
attribute 3:S (frequency: 2), attribute 3:T (frequency: 2)}

(steps A2 to A4)
for x = attribute 1;
  for α = empty, CFD attribute 3:_ → attribute 1:_ (frequency: 4, confidence 0.75) is found;
for x= attribute 2;
  for α = attribute 3:S, CFD attribute 3:S → attribute 1:1 (frequency: 2, confidence 1) is found;
for x= attribute 2;
  for α = empty, CFD empty → attribute 2:P (frequency: 3, confidence 0.75) is found;
  for α = attribute 3:T, CFD attribute 3:T → attribute 2:P is not minimal
for x= attribute 3;
  for α = empty, CFDs attribute 1:_ → attribute 3:_ (frequency: 4, confidence: 1) and
                      attribute 2:_ →   attribute 3:_ (frequency: 4, confidence: 0.75) are found;
  for α = attribute 1:1, CFD attribute 1:1 → attribute 3:S (frequency: 2, confidence 1) is found;
  for α = attribute 2:P, CFD attribute 2:P → attribute 3:T (frequency: 2, confidence 0.667) is found → algorithm end

FIG. 3B database storage unit 31

|  | Attribute 1 | Attribute 2 | Attribute 3 |
|---|---|---|---|
| Tuple 1 | 1 | P | S |
| Tuple 2 | 1 | Q | S |
| Tuple 3 | 2 | P | T |
| Tuple 4 | 3 | P | T | parameter k: 2
parameter p: 0.66 read- database contents

FIG. 3C approximate CFDs obtained
attribute 3:_ → attribute 1:_   frequency: 4, confidence 0.75
attribute 3:S → attribute 1:1   frequency: 2, confidence 1
empty → attribute 2:P           frequency 3, confidence 0.75
attribute 1:_ → attribute 3:_   frequency: 4, confidence 1
attribute 2:_ → attribute 3:_   frequency: 4, confidence 0.75
attribute 1:1 → attribute 3:S   frequency: 2, confidence 1
attribute 2:P → attribute 3:T   frequency: 2, confidence 0.66

RULE DISCOVERY SYSTEM, METHOD, APPARATUS AND PROGRAM

TECHNICAL FIELD

Description of Related Application

The present application is a National Stage Entry of PCT/JP2013/063319 filed May 13, 2013, which is based on and claims the benefit of the priority of Japanese patent application No. 2012-110923, filed on May 14, 2012, the disclosures of all of which are incorporated herein in their entirety by reference.

This invention relates to a technique for rule discovery and, more particularly, to a system, a method, an apparatus and a program for discovery of a rule for a database.

BACKGROUND

In rule discovery in a database, a rule is expressed as CFD (Conditional Function Dependency) and, out of CFD rule candidates generated, a CFD rule(s) corresponding with contents of the database is(are) output. The following gives a brief survey of CFD which is to be the basis for understanding the invention.

CFD is a rule indicating that a functional dependency (abbreviated as FD) expressing dependency among data attributes, holds for a tuple set specified by a condition. CFD includes a conditional part and an antecedent (premise) part, which are on a left hand side (LHD) of the rule, and a consequent part on a right hand side (RHD) of the rule, to which attributes are respectively specified. The conditional part is also referred to as a conditional clause, and the dependency or consequent part is also referred to as a subordinate clause.

The conditional part specifies a subset of data (tuple set). The conditional part represents that an attribute X is of an attribute value x by using a notation 'X=x', where 'x' means that the attribute is of a specified value. Such representation of the attribute value is termed 'constant', in which a constant means a constant value, as an example.

The antecedent part of the rule includes specification of only an attribute. The attribute value not taking a specified value (that is, a wildcard indicating matching to any value), is expressed as 'X=_'. Such representation of the attribute value is termed 'variable'. Note that the 'variable' means 'a variable', as an example. '_' is here termed 'unnamed variable'.

There are two sorts of the consequent part. These are:
(A) The consequent part composed by specifying an attribute and an attribute value (see a rule 1 below, as an example); and
(B) the consequent part that specifies only an attribute (see a rule 2 below, as an example).
The consequent part is expressed,
in the case of (A), as 'A=a', for example, and
in the case of (B), as 'A=_', for an example. In the case where the consequent part includes specification of an attribute value, the antecedent part may be omitted. There may also be such a case where the antecedent part and the consequent part are composed by a plurality of attributes and respective attribute values specified. The following shows example rules:
Rule 1: X1→A (x1∥a)
Rule 2: X1, X2→A(x1, _∥_)

The rule 1 is a rule that states: 'If an attribute X1 is of an attribute value x1, the attribute A is of an attribute value a'. If the rule 1 is valid, it means that, for a tuple set matched to the conditional part, the consequent part is of a specified value. In short, in all tuples of the tuple set satisfying the condition X1=x1, t[A]=a, where t[A] indicates a tuple of the attribute A. Such a rule in which the consequent part is determined at a specified value is termed 'constant CFD' (Constant CFD).

The rule 2 is a rule that states: 'If an attribute X1 is of an attribute value x1, the attribute A is determined in accordance with the attribute X2'. If the rule 2 is valid, it means that, in a tuple set matched to the conditional part, a dependency is present between the attributes specified by the antecedent part and the consequent part. That is, if, in any tuple pair t1 and t2 of the tuple set, satisfying the condition 'X1=x1', t1[X2]=t2[X2], then t1[A]=t2[A]. Such a rule in which the consequent part is not determined at a specified value but has a dependency between attributes is termed a 'variable CFD'. That is, such CFD in which the right hand side of the pattern tuple ∥ is an 'unnamed variable '_' (Tp[A]=_), the rule is termed a variable CFD.

The symbol '∥' in the pattern tuple (x1∥a) of the rule 1 separates the attribute value of X1 on the left hand side from the attribute value of A on the right hand side. Note that, although there is an instance where "(X1→A (x1∥a))" of the rule 1 is noted as "(x→A, (x∥a)", such notations differ only as to the presence of comma and the outer parenthesis, the two obviously expressing the same rule. In similar manner, X1, X2→A(x1, _∥_) of the rule 2 is alternatively noted as ([X1, X2]→A, (x1, _∥_)).

As indices indicating the degree of effectiveness of CFD for given data, a support and confidence, for example, are used. The support is the number of tuples for which a conditional part and an antecedent part of a CFD are matched.

The confidence is the ratio of the number of tuples satisfying the CFD rule to the number of tuples for which a conditional part and an antecedent part are matched.

Given a plurality of CFDs, such CFD satisfying the two conditions of 'left-reduced' and 'most general' is termed 'minimal'.

The following describes the meaning of 'left-reduced'. Given a plurality of CFDs, a CFD, an attribute set of the left-hand side of which does not include an attribute set of the left hand side of any other CFD is said to be 'left-reduced'.

For example, given the following rules 3 and 4:
Rule 3: X1, Y→A(x1, _∥_)
Rule 4: X1, X2, Y→A(x1, x2∥_)
the left hand side of the rule 4 includes the left hand side of the rule 3 (X1 ⊂ X1, X2), so that the rule 4 is not 'left-reduced'. Conversely, the left hand side of the rule 3 does not include the left hand side of the rule 4. Hence, the rule 3 is said to be 'left-reduced'. In this case, the rule 4 is a redundant CFD with respect to the rule 3 and hence may be deleted as such.

The following describes the meaning of 'most general'. If, given a plurality of CFDs, it is not possible to update a constant of an attribute value included in the left hand side of any CFD to '_' (Variable), such CFD is said to be 'most-general'.

For example, given the following rules 5 and 6:
Rule 5: X1, X2→A(x1, _∥a)
Rule 6: X1, X2→A(x1, x2∥a)
the rule 5 may be obtained by replacing the attribute value x2 of the rule 6 by a variable (Variable). Hence, the rule 6 is not 'most-general'. Conversely, the rule 5 is said to be 'most-general'. In such case, the rule 6 is a redundant CFD with respect to the rule 5 and hence may be deleted as such.

The foregoing is the outline of the CFD.

An apparatus that discovers a rule from a database includes a storage means (storage unit), such as a magnetic disc, in which a CFD is stored, a calculation means (calculation unit) that generates a CFD candidate and that decides whether or not the CFD candidate is matched to the contents of the database, and a saving means (saving unit) that stores the CFD, decided to match to contents of the database, in a storage device or memory. The storage means stores the CFD obtained using the rule discovery algorithm. The calculation means generates a CFD candidate, as a subject to be checked, checks for whether or not it is matched to contents of the database and if matched, the calculation means outputs the CFD as being a valid CFD. The saving means stores the valid CFD obtained in the storage device.

As techniques to discover a rule in a database, the following techniques are known, as indicated in e.g., Non-Patent Literature 1:
(1) A technique of generating a candidate of a constant CFD from a free itemset and a corresponding closed itemset;
(2) a technique of generating a CFD candidate by generating a list of attribute-value pairs by a breadth first search, placing one of the terms in a subordinate term (indicated as A) and placing the other term in a conditional part (indicated as X) to obtain an expression: X→A; and
(3) a technique of setting a free itemset as a conditional term (conditional part), placing one attribute not included in the free itemset in a subordinate term (consequent part) and searching an attribute added to the conditional term by depth first search to generate a CFD candidate.

The free itemset is a set of items in which the frequency is truly increased when removing any one or more item(s). An attribute-attribute-value pair appearing in a database is termed an item, and a set of items is termed an itemset.

As discussed in the foregoing, the confidence is among the indices indicating to which extent contents of a database coincide with a CFD.

Non-Patent Literature 2 discloses a technique for discovering a rule (CFD) which, though not fully coincident with contents of a database, has a high confidence value. According to this discovery technique, breadth first search is used to discover a CFD having a confidence greater than or equal to a threshold value. Such CFD is referred to below as 'approximate CFD' meaning that the CFD 'substantially holds'.

To check for validity of a rule, there is disclosed a rule base management apparatus in, for example, Patent Literature 1. The rule base management apparatus includes a rule base to store a rule composed by a conditional part and a conclusion part, an instance information database to store the instance information concerning the results of application of the rule, and a correlation part to correlate a rule and the instance information satisfying the rule, a validity check part to cause an instance retrieving part to retrieve sets of instance information from the instance information database, using the conditional part of the rule to be checked for validity as a key, and calculate the ratio of the instance information satisfying the consequent part of the rule to check the validity of the rule in the set of the instance information based on the ratio thus found. There is also disclosed in Patent Literature 2 a configuration in which a functional dependency (FD) between attributes of a relation to effectuate normalization by relation splitting.

Patent Literature 1:
International Publication No. WO2004/036496A1
Patent Literature 2:
JP Patent Kokai Publication No. JP-H06-110749A
Non-Patent Literature 1:
Wenfei Fan et al., "Discovering Conditional Functional Dependencies", pp. 1231-1234, IEEE International Conference on Data Engineering, 2009, retrieved on Apr. 9, 2012, Internet URL http://homepages.inf.ed.ac.uk/fgeerts/pdf/icde09.pdf Non-Patent Literature 2:
Chiang et al., "Discovering Data Quality Rules", in VLDB, 2008, retrieved on Apr. 9, 2012, Internet URL http://dblab.cs.toronto.edu/~fchiang/docs/vldb08.pdf

SUMMARY

The following describes the analysis of the related techniques made by the present inventors.

A first problem is that CFDs obtained by the CFD discovery algorithm, disclosed in Non-Patent Literature 1, are only those which fully hold for a database, that is, those having the confidence equal to 1, while it is not possible to list those which 'substantially hold' for the database.

A second problem is that the 'approximate CFD' discovery algorithm, disclosed in Non-Patent Literature 2, takes extremely long time for computation. The reason is that the number of CFDs (approximate CFDs) generated tends to produce combinational explosions for large-scale databases, in particular for databases with larger numbers of attributes.

The present invention is invented in view of the above mentioned problems. It is an object of the present invention to provide a system, an apparatus, a method and a program, enabling to obtain highly efficiently a set of rules useful in grasping or correcting contents of a database.

According to the present invention, there is provided a rule discovery system that includes: a storage device configured to store a database; a data processor; and an output device, wherein the data processor includes:

a free itemset generation unit configured to generate a free itemset formed by an item that is an attribute-value pair in the database, a frequency of the free itemset in the database being not less than a predetermined threshold value;

a rule candidate generation unit configured to generate, as a rule candidate, a rule having a conditional part set to the free itemset, having a consequent part thereof set to an item not sharing an attribute with the free itemset of the conditional part, and having an antecedent part thereof set to an attribute included neither in the free itemset of the conditional part nor in the item of the consequent part, the rule candidate generation unit retaining the rule generated in a storage unit;

a rule validity decision unit configured to collate the rule generated by the rule candidate generation unit to the database to decide the rule to be valid when the rule is matched with a confidence greater than or equal to a pre-set threshold value of the confidence; and a rule minimality decision unit configured to decide whether or not the rule decided to be valid by the rule validity decision unit is minimal, the rule minimality decision unit outputting the rule to the output device when the rule is decided to be minimal.

In accordance with another aspect of the present invention, there is provided a rule discovery method wherein a rule is discovered from a database by a data processor including a free itemset generation unit, a rule candidate generation unit, a valid rule candidate generation unit and a rule minimality decision unit, the method comprising the processing of:

(a) the free itemset generation unit reading from a database to generate a free itemset formed by an item that is an attribute-value pair in the database, a frequency of the free itemset in the database being greater than or equal to a pre-set threshold value, the free itemset generation unit storing the free itemset generated in a storage unit;

(b) the rule candidate generation unit generating, as a rule candidate, a rule having a conditional part set to the free itemset, having a consequent part set to an item not sharing an attribute with the free itemset of the conditional part, and having an antecedent part set to an attribute included neither in the free itemset of the conditional part nor in the item of the consequent part, the rule candidate generation unit retaining the rule generated in a storage unit;

(c) the rule validity decision unit collating the rule generated by the rule candidate generation unit to the database to decide the rule to be valid, when the rule is matched with a confidence greater than or equal to a pre-set threshold value of the confidence; and (d) the rule minimality decision unit deciding whether or not the rule decided to be valid by the rule validity decision unit is minimal, the rule minimality decision unit outputting the rule to an output device when the rule is decide to be minimal.

In accordance with another aspect of the present invention, there is provided a non-transitory recording medium storing a computer program causing a computer to execute the processing including:

(a) reading from a database, generating a free itemset formed by an item that is an attribute-value pair in the database; a frequency of the free itemset in the database being greater than or equal to a pre-set threshold value, and storing the free itemset generated in a storage unit;

(b) generating, as a rule candidate, a rule having a conditional part set to the free itemset, having a consequent part set to an item not sharing an attribute with the free itemset, and having an antecedent part set to an attribute included neither in the free itemset of the conditional part nor in the item of the consequent part, and retaining the rule generated in the storage unit;

(c) collating the rule generated to the database and deciding the rule to be valid when the rule is matched with a confidence greater than or equal to a pre-set threshold value of the confidence; and (d) deciding whether or not the rule decided to be valid is minimal and outputting the rule to an output device when the rule is decided to be minimal. The present invention provides a memory device (semiconductor memory) or a magnetic/optical medium (memory) that has recorded the rule discovery program.

In accordance with yet another aspect of the present invention, there is provided an apparatus for rule discovery comprising:

a free itemset generation unit configured to read a database and to generate a free itemset formed by an item that is an attribute-value pair in the database, a frequency of the free itemset in the database being greater than or equal to a pre-set threshold value;

a rule candidate generation unit configured to retain, in a storage unit, as a rule candidate, a rule having a conditional part set to the free itemset and having a consequent part fixed to an attribute not included in the conditional part, a set of attributes of an antecedent part of the rule included in neither the free itemset of the conditional part nor in the item of the consequent part being found by depth first search;

a rule validity decision unit configured to collate the rule generated by the rule candidate generation unit to the database, the rule validity decision unit deciding the rule to be valid when the rule is matched with a confidence greater than or equal to a pre-set threshold value of the confidence; and a rule minimality decision unit configured to decide the rule to be minimal, when the rule decided to be valid by the rule validity decision unit is itself minimal, or when a rule obtained on removing one item from the conditional part of the rule is not valid, and to output the rule to the output device, the rule minimality decision unit rule not outputting the rule to the output device when the rule decided to be valid by the rule validity decision unit is redundant with respect to a rule already found.

According to the present invention, it is possible to obtain highly efficiently a set of rules useful in grasping or correcting contents of a database.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 3A, 3B and 3C are diagrams illustrating a specific example operation of the first exemplary embodiment of the present invention.

PREFERRED MODES

Figure 1:
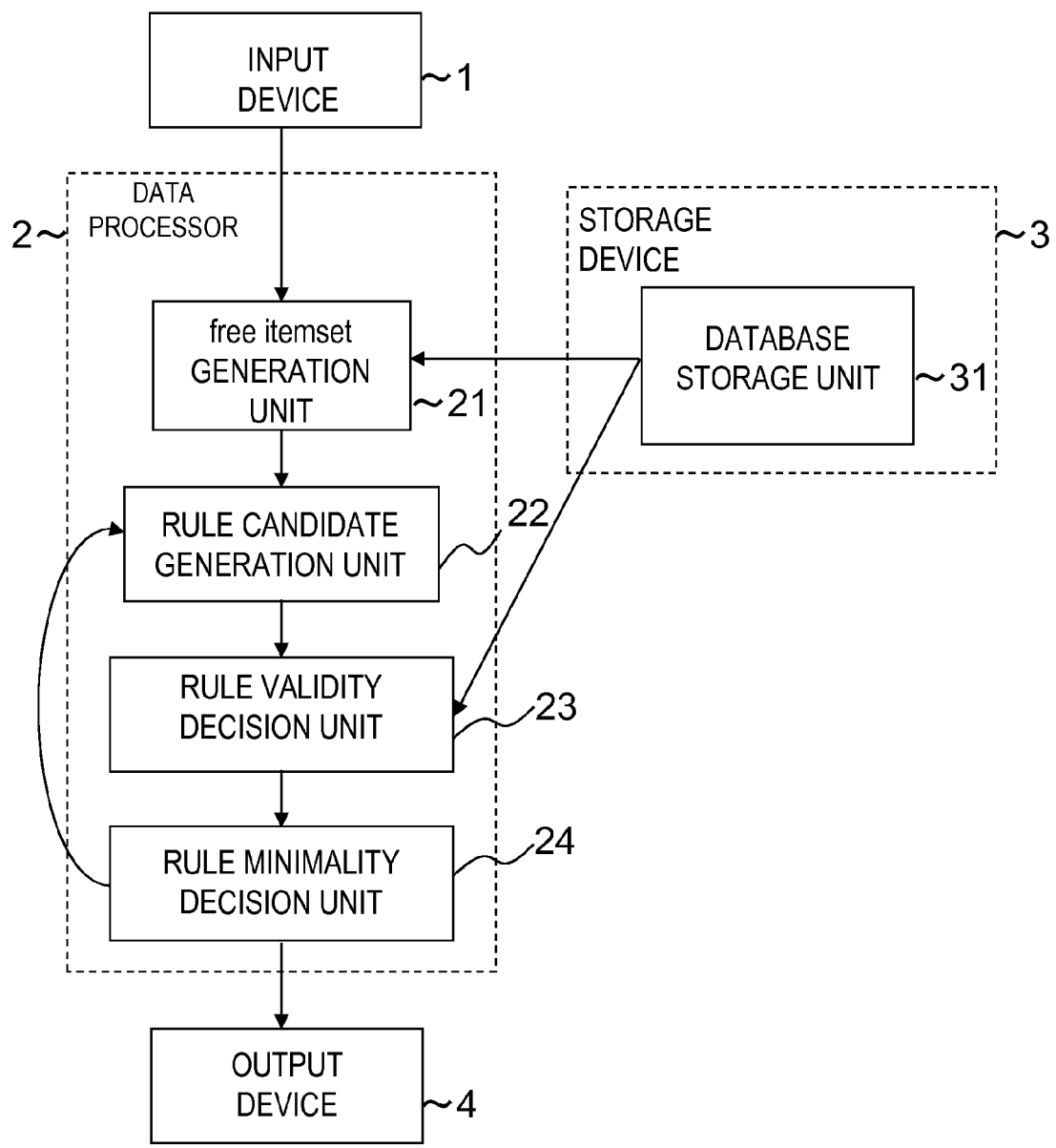
FIG. 1 is a block diagram illustrating a configuration of a first exemplary embodiment of the present invention.

The following describes exemplary embodiments of the present invention with reference to the drawings. According to the present invention, a set of approximate CFDs, matched to contents of a database, is calculated, based on the database and a parameter(s) entered by the user. More specifically, there are provided a free itemset generation unit (21 of FIG. 1) configured to calculate a free itemset based on contents of a database (database stored in the database storage unit 31 of FIG. 1) and a parameter(s) supplied from an input device (1 of FIG. 1), a rule candidate generation unit (rule candidate generation unit 22 of FIG. 1) configured to generate a rule candidate based on the free itemset obtained, a rule validity decision unit (rule validity decision unit 23 of FIG. 1) configured to decide whether or not the rule candidate generated is valid, and a rule minimality decision unit (rule minimality decision unit 24 of FIG. 1) configured to check whether or not the valid rule obtained is not redundant with respect to a valid rule(s) already obtained.

According to the exemplary embodiments, there are provided a free itemset generation unit (free itemset generation unit 21 of FIG. 1) configured to generate a free itemset that is formed of items, each being an attribute-value pair in the database, a frequency of the free itemset in the database being greater than or equal to a predetermined threshold value (frequent free itemset), a rule candidate generation unit (rule candidate generation unit 22 of FIG. 1) configured to generate a rule and store the generated rule in a storage unit, wherein the rule, as a rule (CFD) candidate, has the above mentioned free itemset ($\alpha$) as a conditional part, while having an item (x) not sharing an attribute with the above mentioned free itemset, as a consequent part, and having an attribute included neither in the above mentioned $\alpha$ nor in the above mentioned x, a rule validity decision unit (rule validity decision unit 23 of FIG. 1) configured to collate the rule generated by the rule candidate generation unit (rule candidate generation unit 22 of FIG. 1) to the database and to decide the rule to be valid when the rule is matched to the database with a confidence greater than or equal to a predetermined threshold value of the confidence, a rule minimality decision unit (rule minimality decision unit 24) configured to check whether or not the rule decided to be valid by the rule validity decision unit (rule validity decision unit 23 of FIG. 1) is minimal and to output the rule to the output device (4 of FIG. 1) if the rule is minimal.

The rule minimality decision unit (rule minimality decision unit 24) decides that the rule decided to be valid by the rule validity decision unit (rule validity decision unit 23 of FIG. 1) is minimal, when the rule itself is minimal or when a rule obtained on removing just one item from the conditional part of the rule is not valid, and outputs the rule to the output device (4), while the rule is not output to the output device (4) when the rule decided to be valid by the rule validity decision unit (rule validity decision unit 23 of FIG. 1) is redundant with respect to the rule(s) already obtained.

According to the present invention, a candidate that can become a part of a condition term of a rule (CFD) may be found speedily by initially calculating a free itemset. Just a minimal rule(s) (approximate CFD(s)) may be efficiently obtained by:
  a conditional part of the rule (CFD) being made to have a free itemset;
  a consequent part of the rule (CFD) being fixed to have an attribute not included in the conditional part;
  finding a set of attributes of an antecedent part of the rule (CFD) by depth first search (DFS). That is, a set of rules (approximate CFDs) useful for a user to grasp or correct contents of a database may be obtained efficiently. In the following, exemplary embodiments will be described.

<Exemplary Embodiment 1>

Referring to FIG. 1, a first exemplary embodiment of the present invention includes an input device 1, such as a keyboard, a data processor 2 operating under program control, a storage device 3 to store the information, and an output device 4, such as a display device or a printer.

The storage device 3 includes a database storage unit 31. In the database storage unit 31, there is stored a database from which a rule(s) is (are) to be extracted.

The data processor 2 includes a free itemset generation unit 21, a rule candidate generation unit 22, a rule validity decision unit 23 and a rule minimality decision unit 24.

The free itemset generation unit 21 generates a free itemset of the database stored in the database storage unit 31, using a certain parameter(s) (a frequency threshold value: k, and a confidence threshold value: p) supplied from the input device 1. The free itemset generation unit 21 stores the generated free itemset in a not shown storage unit in the data processor 2, in a not shown storage unit in the free itemset generation unit 21, or in a pre-set storage area in the storage device 3. An attribute-value pair, appearing in the database, is termed an item, and a set of the items is termed an itemset.

The rule candidate generation unit 22 generates, as a rule candidate, a rule by DFS (Depth First Search). The rule has
  a free itemset $\alpha$, generated by the free itemset generation unit 21, as a conditional part thereof, while having
  an item x, not sharing the attribute with the free itemset a, placed in a consequent part thereof, and also having
  a subset $\beta$ of the attributes, included neither in $\alpha$ nor in x, placed in an antecedent part thereof.

The rule candidate generation unit 22 stores the rule, generated as the rule candidate, in a not shown storage unit in the data processor 2, in a not shown storage unit in the rule candidate generation unit 22, or in the pre-set storage area in the storage device 3.

The rule validity decision unit 23 checks whether or not the rule, generated by the rule candidate generation unit 22, is valid, for example, is a rule having a frequency greater than or equal to k and having a confidence greater than or equal to p. If the rule is valid, the rule validity decision unit delivers the rule to the minimality decision unit 24 and does not perform any additional depth search.

The rule minimality decision unit 24 judges whether or not the rule decided to be valid by the rule validity decision unit 23 is minimal. If the rule is found to be minimal, the rule is output to the output device 4. A rule 'being minimal' means that neither CFD obtained on removing any item from a conditional part or an antecedent part of the rule nor CFD obtained on changing a value of an item in the conditional part and placing the item in an antecedent part is valid. When the search for all combinations of the free itemset(s) and attribute(s) of the consequent part is terminated, an algorithm comes to a close.

Figure 2:
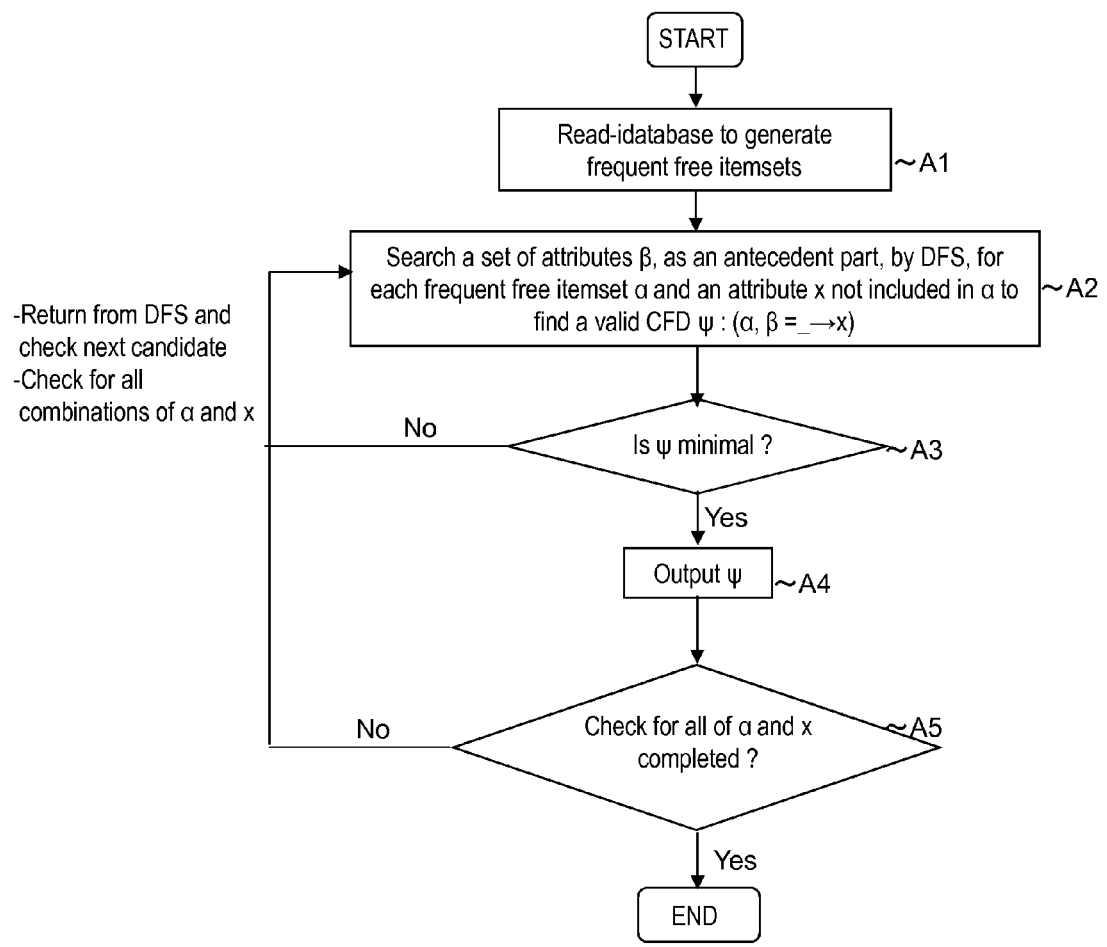
FIG. 2 is a flowchart showing an operation of the first exemplary embodiment of the present invention.

The following described an operation of the present exemplary embodiment in detail with reference to FIG. 1 and FIG. 2.

The parameters provided from the input device 1 (a threshold value of the frequency k and a threshold value of the confidence p), and contents of the database provided from the database storage unit 31, are supplied to the free itemset generation unit 21.

From an attribute-value pair(s), appearing in the database, the free itemset generation unit 21 extracts a free itemset (frequent free itemset) having a frequency greater than or equal to the parameter k (step A1). The attribute-value pair is referred to as an item. The free itemset is a set of items in which, by removing any one or more item(s), the frequency of the free itemset is truly increased.

After acquisition of the total of the free itemsets, the free itemset generation unit 21 arrays them in an ascending order of a size of the free itemset(size being the number of items included therein).

The rule candidate generation unit 22 then generates a rule candidate from each free itemset generated by the free itemset generation unit 21. More specifically, a rule (CFD) candidate
  $\phi: (\alpha, \beta=\_) \to x$,
where
  the free itemset $\alpha$ is set as a conditional part of the rule,
  the item x, not sharing the attribute with the free itemset $\alpha$, is fixed in a consequent part of the rule, and
  a subset $\beta$ of attributes, included neither in $\alpha$ nor in x, is placed in an antecedent part of the rule,
is generated by performing depth first search (DFS) for $\beta$ (step A2).

The rule validity decision unit 23 then collates the rule generated by the rule candidate generation unit 22 (rule candidate):
  $\phi: (\alpha, \beta=\_) \to x$
to the database retained in the database storage unit 31 to check whether or not the rule candidate $\phi$ is valid. As an example, it is checked whether or not the confidence of the rule is greater than or equal to a preset threshold value of 0.66.

If the rule candidate $\phi$ is valid, the rule validity decision unit 23 hands over the rule candidate $\phi$ to the rule minimality decision unit 24 and refrains from performing any deeper search in the depth first search (step A2).

The rule minimality decision unit 24 then decides whether or not the rule candidate $\phi$ obtained by the rule validity decision unit 23 (approximate CFD having the confidence greater than or equal to the threshold value) is minimal (step A3).

If the rule candidate φ is minimal, the rule minimality decision unit 24 outputs the rule candidate φ to the output device 4 (step A4).

If, in the rule minimality decision unit 24, the above check has not yet been completed for the totality of combinations of the free itemset α and the attribute x, processing returns to the step A2.

When the above check has been completed, the rule discovery algorithm comes to an end. As a result, the minimal rule(s) (approximate CFD(s)) so far obtained has (have) been output at the output device 4.

The following describes advantageous effects of the present exemplary embodiment.

In the present exemplary embodiment, by listing free itemsets initially, candidates of conditional parts of the total of the approximate CFDs are listed, and with a conditional part as well as a consequent part of the rule being fixed, the set of the attributes of antecedent part of the rule is searched by depth first search. It is thus possible to suppress a required memory capacity from increasing. Moreover, the generation of approximate CFD candidates may be suppressed to a minimum to render it possible to discover a rule(s) efficiently.

The following describes the operation of the present exemplary embodiment with reference to a specific Example. A data set, made up by attributes and tuples of the following Table 1, is registered in the database storage unit 31, as shown in FIG. 3B, which is the same as the Table 1. It is noted that the database example is highly simplified only for explanation. FIG. 3A shows specific examples of rule (CFD) candidates of free itemsets (frequent free itemsets) and items x=attributes 1, 2 and 3, in accordance with step A1 of FIG. 2. FIG. 3C shows examples of rules (approximate CFDs) output from the output device 4 as a result of the calculations of FIG. 2. It is noted that, in FIG. 3, a symbol ':' in "attribute 1:_", "attribute 1:1" or the like is synonymous (same) with a symbol '=' in the "attribute 1=_", "attribute 1=1" or the like.

TABLE 1

|  | Attribute 1 | Attribute 2 | Attribute 3 |
| --- | --- | --- | --- |
| Tuple 1 | 1 | P | S |
| Tuple 2 | 1 | Q | S |
| Tuple 3 | 2 | P | T |
| Tuple 4 | 3 | P | T |

The free itemset generation unit 21 receives the above Table 1 and, as parameters, k=2 and p=0.66, where k is a lower limit of the frequency and p is a lower limit of a confidence, these limit values being used to decide whether or not a rule is valid. A list of all free itemsets each having a frequency of occurrence in the database greater than or equal to k=2 {empty (4), "attribute 1=1" (2), "attribute 2=P" (3), "attribute 3=S" (2) and "attribute 3=T" (2)} is extracted (step A1 of FIG. 2 and FIG. 3) (The numerical value in parenthesis denotes the frequency of the itemset). The free itemset with an occurrence frequency greater than or equal to k is also termed 'frequent free itemset'.

These five free itemsets are sorted in an ascending order with regard to a size. Thus, empty is the first to appear (see the frequent free itemsets of step A1 of FIG. 3A).

The rule candidate generation unit 22 then generates rule candidates having attributes 1, 2 and 3 in the consequent part x of the rule.

The rule candidate generation unit 22 sets, for x=attribute 1 (consequent part), the free itemset α as a conditional part, to empty and performs depth first search. This generates a rule (CFD) in which the antecedent part β=attribute 3, that is, φ="attribute 3:_"→"attribute 1:_" (frequency=4 and confidence=0.75).

The rule candidate generation unit 22 sets the free itemset α as the conditional part to "attribute 3=S" and performs depth first search to generate a rule (CFD) in which the antecedent part β=empty, that is, φ: "attribute 3:S"→"attribute 1:1" (frequency=2 and confidence=1).

In similar manner, for x=attribute 2 (consequent part), the rule candidate generation unit 22 sets the free itemset a, as the conditional part, to empty and performs depth first search to generate a rule in which the antecedent part "β=empty", that is, φ: empty→"attribute 2:P" (frequency=3 and confidence=0.75).

For x=attribute 2 (consequent part), the rule candidate generation unit 22 sets the free itemset a, as the conditional part to "attribute 3=T", and performs depth first search to generate a rule with the antecedent part "β=empty":

φ'="attribute 3:T"→"attribute 2: P"

(The Rule Generated is not Minimal).

For x=attribute 3 (consequent part), the rule candidate generation unit 22 performs depth first search for the free itemset α=empty, as the conditional part to generate rules in which the antecedent part "β=empty":

φ="attribute 1:_"→"attribute 3:_" (frequency=4 and confidence=1) and

φ="attribute 2:_"→"attribute 3:_" (frequency=4 and confidence=0.75).

For x=attribute 3 (consequent part), the rule candidate generation unit 22 performs depth first search for the free itemset α as the conditional part set to the "attribute 1=1" to generate a rule in which the antecedent part "β=empty":

φ="attribute 1:1"→"attribute 3:S" (frequency=2, confidence=1). In addition, depth first search is performed with a being set to the "attribute 2=P" to generate a rule in which the antecedent part "β=empty":

φ: "attribute 2:P"→"attribute 3:T" (frequency=2, confidence=0.667) (step A2 of FIG. 2 and FIG. 3A.

For rules generated in a step A2 of FIGS. 2 and 3A, decisions on minimality are made directly after these rules are generated. More specifically, as for the rule φ: "attribute 3:_"→"attribute 1:1"

the rule itself is minimal.

As for the rule:

φ="attribute 3:S"→"attribute 1:1"

a CFD obtained on removing the sole item from the conditional part:

φ': empty→"attribute 1:1"

is not valid and hence the CFD is minimal.

φ': empty→"attribute 2:P"

is also minimal.

φ': "attribute 3:T"→"attribute 2:P"

is redundant with respect to a rule already obtained:

φ: empty→"attribute 2:P"

and hence is not minimal, so that it is not output.

As for other CFDs:

φ: "attribute 1:_"→"attribute 3:_" and

φ: "attribute 2:_"→"attribute 3:_"

each rule itself is minimal.

As for

φ: "attribute 1:1"→"attribute 3:S" and

φ: "attribute 2:P"→"attribute 3:T"

the CFDs obtained on removing the sole item from the conditional part:

empty→"attribute 3:S" and
empty→"attribute 3:T"
are not valid, and hence the CFDs are minimal. These CFDs are output at the output device 4 (step A4 of FIG. 3A).

<Exemplary Embodiment 2>

Figure 4:
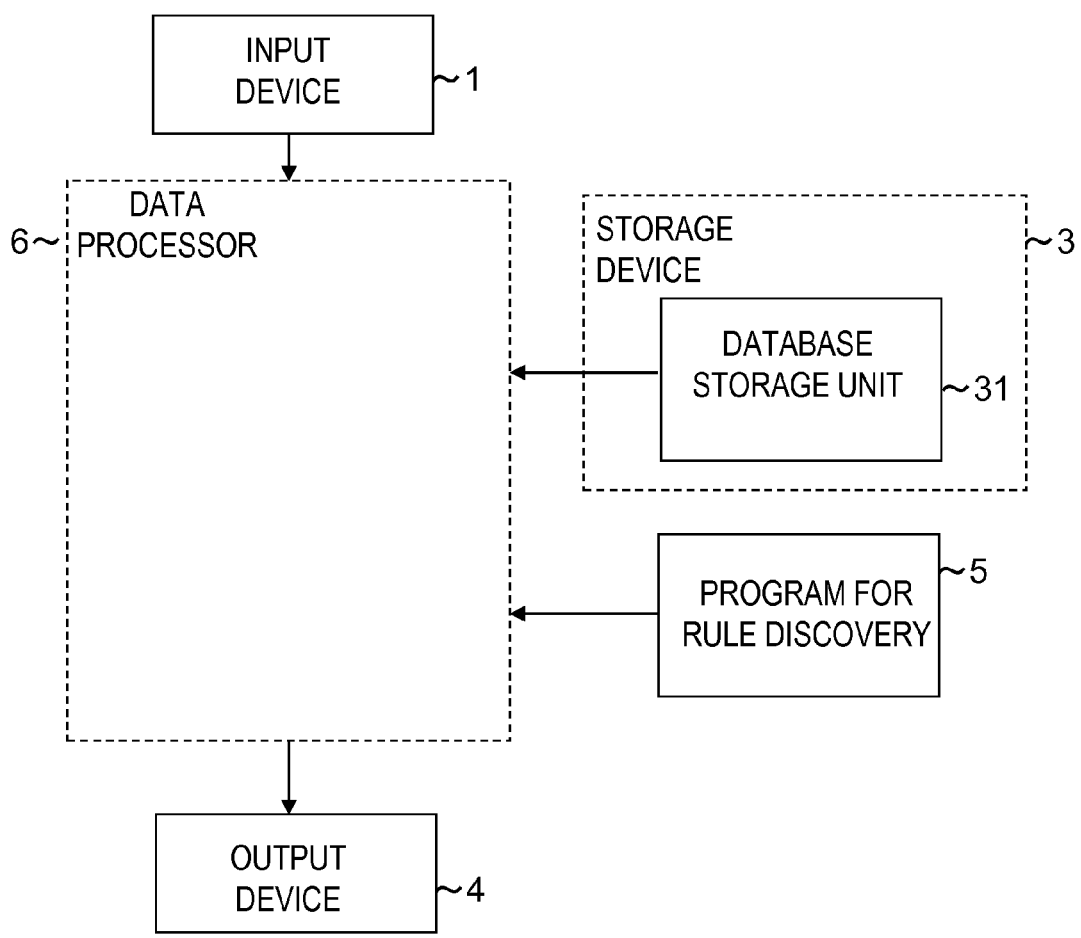
FIG. 4 is a block diagram illustrating a configuration of a second exemplary embodiment of the present invention.

The following described a second exemplary embodiment of the present invention in detail with reference to the drawings. Referring to FIG. 4, the present exemplary embodiment includes a program for rule discovery 5. The program for rule discovery 5 is read into a data processor 6 to control the operation of the data processor. Under control by the program for rule discovery 5, the data processor 6 executes the following processing, that is, the processing which is the same as that executed by the data processor 2 in the first exemplary embodiment.

When a user's interest is supplied from the input device 1, an initial rule candidate is generated, with the use of a database stored in the database storage unit 31 in the storage device 3. It is then checked whether or not the rule candidate is valid. If the rule checked is found to be valid, it is added into a list.

When the set of rules retained in the list shows that a database coverage satisfies a finish condition, the rule set in the list is displayed on the output device 4.

The disclosures of the aforementioned Patent Literatures are incorporated by reference herein. The particular Examples may be modified or adjusted within the gamut of the entire disclosure of the present invention, inclusive of claims, based on the fundamental technical concept of the invention. Moreover, a variety of combinations or selection of elements disclosed inclusive of the elements of claims, Examples and the drawings may be made within the concept of the claims. The present invention may encompass a wide variety of modifications or corrections that may occur to those skilled in the art in accordance with the entire disclosure of the present invention, inclusive of claims and the technical concept of the invention. In particular, as for the range of numerical values indicated herein, it is to be understood that any optional values or sub-ranges comprised within the range are concretely indicated even if the values or sub-ranges are not stated explicitly.

The invention claimed is:

1. A rule discovery system comprising:
a storage device configured to store a database;
a data processor; and
an output device, wherein
the data processor includes:
a free itemset generation unit configured to generate a free itemset formed by an item that is an attribute-value pair in the database, a frequency of the free itemset in the database being not less than a predetermined threshold value;
a rule candidate generation unit configured to generate, as a rule candidate, a rule having a conditional part set to the free itemset, having a consequent part thereof set to an item not sharing an attribute with the free itemset of the conditional part, and having an antecedent part thereof set to an attribute included neither in the free itemset of the conditional part nor in the item of the consequent part, the rule candidate generation unit retaining the rule generated in a storage unit;
a rule validity decision unit configured to collate the rule generated by the rule candidate generation unit to the database to decide the rule to be valid when the rule is matched with a confidence greater than or equal to a pre-set threshold value of the confidence; and
a rule minimality decision unit configured to decide whether or not the rule decided to be valid by the rule validity decision unit is minimal, to output the rule to the output device when the rule is decided to be minimal, and to control not to output the rule decided to be valid to the output device when the rule decided to be valid by the rule validity decision unit is redundant with respect to a rule already found,
wherein the free item generation unit is further configured to generate a plurality of free itemsets and to sort the plurality of free itemsets in an ascending order according to respective sizes of the plurality of free itemsets,
wherein the rule candidate generation unit is further configured to generate, as one or more rule candidates, one or more rules corresponding to the plurality of free itemsets in the ascending order of the respective sizes of the plurality of free itemsets, and
wherein the rule validity decision unit is further configured to collate and determine the validity of the one or more rules corresponding to the plurality of free itemsets in the ascending order of the respective sizes of the plurality of free itemsets.

2. The rule discovery system according to claim 1, wherein the rule candidate generation unit is further configured to set the conditional part to the free itemset, and to fix the consequent part to an attribute not included in the conditional part to find a set of the attributes of the antecedent part by depth first search.

3. The rule discovery system according to claim 1, wherein the rule minimality decision unit is further configured to decide the rule to be minimal and to output the rule to the output device when the rule decided to be valid by the rule validity decision unit is itself minimal, or when a rule obtained on removing one item from the conditional part of the rule is not valid.

4. The rule discovery system according to claim 1, further comprising:
an input device configured to input the threshold value of the frequency and the threshold value of the confidence as setting parameters.

5. The rule discovery system according to claim 1, wherein the rule is a rule represented by CFD (Conditional Functional Dependency).

6. A rule discovery method wherein a rule is discovered from a database by a data processor including a free itemset generation unit, a rule candidate generation unit, a valid rule candidate generation unit and a rule minimality decision-unit, the method comprising the processing of:
the free itemset generation unit reading from a database to generate a free itemset formed by an item that is an attribute-value pair in the database, a frequency of the free itemset in the database being greater than or equal to a pre-set threshold value, the free itemset generation unit storing the free itemset generated in a storage unit;
the rule candidate generation unit generating, as a rule candidate, a rule having a conditional part set to the free itemset, having a consequent part set to an item not sharing an attribute with the free itemset of the conditional part, and having an antecedent part set to an attribute included neither in the free itemset of the conditional part nor in the item of the consequent part, the rule candidate generation-unit retaining the rule generated in a storage unit;
the rule validity decision unit collating the rule generated by the rule candidate generation unit to the database to decide the rule to be valid, when the rule is matched with a confidence greater than or equal to a pre-set threshold value of the confidence; and the rule minimality decision unit deciding whether or not the rule decided to be valid by the rule validity decision unit is minimal, the rule minimality decision unit outputting the rule to an output device when the rule is decide to be minimal, and the rule minimality decision unit controlling not to output the rule decided to be valid to the output device when the rule decided to be valid by the rule validity decision unit is redundant with respect to a rule already found, the free item generation unit generating a plurality of free itemsets and sorts the plurality of free itemsets in an ascending order according to respective sizes of the plurality of free itemsets, the rule candidate generation unit generating, as one or more rule candidates, as one or more rule candidates, one or more rules corresponding to the plurality of free itemsets in the ascending order of the respective sizes of the plurality of free itemsets, and the rule validity decision unit collating and determining the validity of the one or more rules corresponding to the plurality of free itemsets in the ascending order of the respective sizes of the plurality of free itemsets.

7. The rule discovery method according to claim 6, comprising:

the rule candidate generation-unit setting the conditional part to the free itemset and fixing the consequent part to an attribute not included in the conditional part to find a set of the attributes of the antecedent part by depth first search.

8. The rule discovery method according to claim 6, comprising:

the rule minimality decision unit deciding the rule to be minimal to output the rule to the output device when the rule decided to be valid by the rule validity decision unit is itself minimal, or when a rule obtained on removing one item from the conditional part of the rule is not valid, while when the rule decided to be valid by the rule validity decision unit is redundant with respect to a rule already found, the rule minimality decision unit not outputting the rule to the output device.

9. A non-transitory recording medium storing a computer program causing a computer to execute the processing comprising:

reading from a database, generating a free itemset formed by an item that is an attribute-value pair in the database; a frequency of the free itemset in the database being greater than or equal to a pre-set threshold value, and storing the free itemset generated in a storage unit;

generating, as a rule candidate, a rule having a conditional part set to the free itemset, having a consequent part set to an item not sharing an attribute with the free itemset, and having an antecedent part set to an attribute included neither in the free itemset of the conditional part nor in the item of the consequent part, and retaining the rule generated in the storage unit;

collating the rule generated to the database and deciding the rule to be valid when the rule is matched with a confidence greater than or equal to a pre-set threshold value of the confidence;

deciding whether or not the rule decided to be valid is minimal and outputting the rule to an output device when the rule is decided to be minimal; and controlling not to output the rule decided to be valid to the output device when the rule decided to be valid by the rule validity decision unit is redundant with respect to a rule already found, wherein the reading from the database comprises generating a plurality of free itemsets and sorts the plurality of free itemsets in an ascending order according to respective sizes of the plurality of free itemsets, wherein the generating comprises generating, as one or more rule candidates, one or more rules corresponding to the plurality of free itemsets in the ascending order of the respective sizes of the plurality of free itemsets, and wherein the collating comprises collating and determining the validity of the one or more rules corresponding to the plurality of free itemsets in the ascending order of the respective sizes of the plurality of free itemsets.

10. An apparatus for rule discovery comprising:

a free itemset generation unit configured to read a database and to generate a free itemset formed by an item that is an attribute-value pair in the database, a frequency of the free itemset in the database being greater than or equal to a pre-set threshold value;

a rule candidate generation-unit configured to retain, in a storage unit, as a rule candidate, a rule having a conditional part set to the free itemset and having a consequent part fixed to an attribute not included in the conditional part, a set of attributes of an antecedent part of the rule included in neither the free itemset of the conditional part nor in the item of the consequent part being found by depth first search;

a rule validity decision-unit configured to collate the rule generated by the rule candidate generation-unit to the database, the rule validity decision unit deciding the rule to be valid when the rule is matched with a confidence greater than or equal to a pre-set threshold value of the confidence; and a rule minimality decision unit configured to determine the rule to be minimal, when the rule decided to be valid by the rule validity decision unit is itself minimal, or when a rule obtained on removing one item from the conditional part of the rule is not valid, to output the rule to the output device, and to not output the rule to the output device when the rule decided to be valid by the rule validity decision unit is redundant with respect to a rule already found, wherein the free item generation unit is further configured to generate a plurality of free itemsets and to sort the plurality of free itemsets in an ascending order according to respective sizes of the plurality of free itemsets, wherein the rule candidate generation unit is further configured to generate, as one or more rule candidates, one or more rules corresponding to the plurality of free itemsets in the ascending order of the respective sizes of the plurality of free itemsets, and wherein the rule validity decision unit is further configured to collate and determine the validity of the one or more rules corresponding to the plurality of free itemsets in the ascending order of the respective sizes of the plurality of free itemsets.

* * * * *